Dec. 24, 1935. J. J. LONG 2,025,520
AGRICULTURAL IMPLEMENT
Filed July 16, 1934
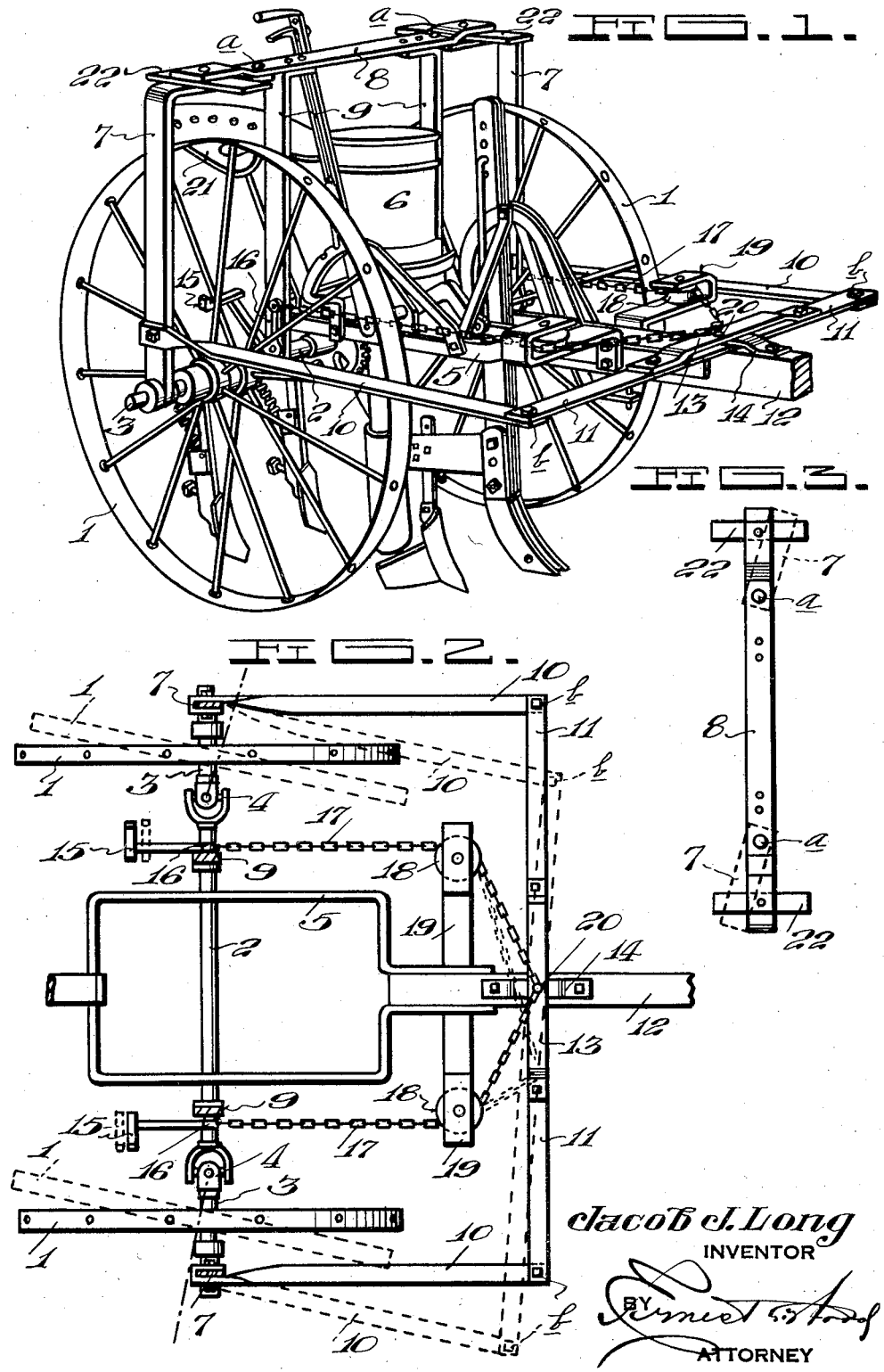
Jacob J. Long
INVENTOR
BY
ATTORNEY Patented Dec. 24, 1935

2,025,520

UNITED STATES PATENT OFFICE 2,025,520

AGRICULTURAL IMPLEMENT

Jacob J. Long, Elm Mott, Tex.

Application July 16, 1934, Serial No. 735,401

4 Claims. (Cl. 280—87.1)

This invention relates to agricultural implements and it has particular reference to steering mechanism for planters and other similar implements.

The principal object of the invention is to provide a simple steering mechanism for planters which is particularly advantageous in planting terraced soil or in cases where the terrain is sloping, which makes it difficult to travel a straight course. The present invention is so designed that the operator may control the movements of the implement without undue exertion and without slowing down the speed of the implement or imposing any undue strain upon the draft animal or tractor as the case may be.

With the foregoing objects as paramount, the invention has particular reference to its salient features of construction and arrangement of parts which will become manifest as the description proceeds, taken in connection with the accompanying drawing, wherein:—

Figure 1 is a perspective view of a planter equipped with the invention.

Figure 2 is a plan view of a portion broken away and showing in dotted lines an adjusted position, and Figure 3 is a detail view of the upper cross member also showing in dotted lines an adjusted position corresponding to that shown in Figure 2.

Continuing with a more detailed description of the drawing, 1 designates the wheels of the implement mounted upon an axle 2, the end portions 3 of which are joined to the central portion by means of universal joints 4. This arrangement is for the obvious purpose of constraining the wheels to move parallel with one another at all times as exemplified in Figure 2.

The frame of the implement is comprised of the central support 5 for the dropper 6 when the invention is adapted to a planter as shown. An upright 7 is provided on either side of the implement and is joined to the movable axle sections 3 on the outside of the wheels 1. This member 7 extends upwardly and over the wheels 1 and is pivotally joined at $a$ to a cross member 8 shown in detail in Figure 3. As a support for this cross member, a pair of parallel uprights 9 are provided on the inside of the wheels 1 and must of necessity be secured by the central portion 2 of the axle.

The uprights 7 are braced by bars 10 which extend toward the front of the implement and their ends are pivotally secured at $b$ to a bar 11 extending across and in front of the implement. The bar 11 is supported upon the tongue 12 and since it must move longitudinally, it is guided by relatively conformable metal straps 13 and 14, the strap 14 being secured to the tongue 12 and overlying the bar 11 while the strap 13 is secured to the bar 11 and overlies the strap 14.

A pair of foot actuated levers 15 are lockably mounted upon the central portion 2 of the axles and these levers being constructed on the principle of a bell crank have arms 16 to each of which is connected the end of a chain 17. The chain extends around the sheave or pulley 18 rotatably disposed in mountings 19 affixed to either side of the tongue 12 and is secured at 20 to the metal strap 13 affixed to the bar 11.

From the foregoing it will be seen that an operator sitting upon the seat 21, in moving one of the pedals 15 downwardly will exert a pull upon the chain 17 and will accordingly cause the bar 11 to move longitudinally as shown in dotted lines in Figure 2. Such movement of the bar 11 will cause the uprights 7 to change their relative positions with respect to the cross member 8 and to insure sufficient strength at their points of pivotal securement to the cross member 8, members 22 are secured to either end of the cross member 8 and against which the upper end of the uprights 7 slidingly engage. By broadening the ends of the cross member 8, the members 22 may be omitted, although since the movements of the uprights 7 relative to the cross member are very slight at this point, no means such as afforded by the members 22 may be necessary.

Accordingly, in cultivating or planting, the soil, the operator has only to actuate one or the other of the levers or pedals 15 to return the implement to its straight course should it deviate therefrom and as stated previously, this may be done without slowing down or putting any strain upon the draft animal or tractor.

Manifestly, the construction shown is capable of some modification and such modification as is considered within the scope and meaning of the appended claims is also considered within the spirit and intent of the invention.

What is claimed is:

1. In a wheeled agricultural implement, a steering mechanism comprising an axle in sections, each section being connected to the other by a universal joint, wheels carried by the outer of said sections, parallel uprights mounted on the inner of said sections and carrying a cross member, a pair of vertical uprights mounted on the outer of said sections and pivotally secured to the ends of said cross member, a bar arranged for longitudinal movement forward of said implement and having pivotal connection with said latter uprights and means carried by the inner of said axle sections and having operative connection with said longitudinally movable bar for actuating the same to thereby move said wheels simultaneously relative to the inner section of said axle.

2. In an agricultural implement, a steering mechanism including an axle whose end portions are universally connected to the body thereof and carrying wheels, a cross member disposed above said wheels and rigidly supported from the body of said axle, a pair of uprights secured to the end portions of said axle and having pivotal connection with the end of said cross member, a bar disposed forwardly of said implement and having pivotal connection with said uprights, a chain having its ends connected to said axle and operatively connected to said bar whereby to effect movement of said bar longitudinally, thereby to cause said wheels to move simultaneously.

3. In an agricultural implement, an axle whose end portions are universally secured to the main body thereof, a pair of uprights mounted upon the end portions, a cross member supported by the main body of said axle and having its ends pivotally connected with said uprights, wheels carried by the end portions of said axle a bar disposed forwardly of said implement a chain connected to said axle at its ends and to said bar whereby to change the relative positions of said uprights to thereby move said wheels.

4. A steering mechanism for agricultural implements including in combination with the frame of said implement, an axle having end portions capable of changing their relative position with respect to the body of said axle, said end portions carrying wheels, a pair of uprights secured to the outer ends of said end portions, a connecting cross member whose ends are pivoted to the upper end of said uprights, a bar disposed forwardly of said wheels, a chain connected to said axle at its ends and to said bar midway between its ends whereby said wheels will be simultaneously moved when said latter means is moved longitudinally.

JACOB J. LONG.